(12) United States Patent
Forrest

(10) Patent No.: US 7,258,200 B2
(45) Date of Patent: Aug. 21, 2007

(54) TREE STAND

(76) Inventor: Lewis Forrest, 579 Anderson Road, RR #2, Amprior, Ontario (CA) K7S 3G8

( * ) Notice: Subject to any disclaimer, the term of this patent is extended or adjusted under 35 U.S.C. 154(b) by 40 days.

(21) Appl. No.: 11/324,269

(22) Filed: Jan. 4, 2006

(65) Prior Publication Data

US 2007/0151804 A1  Jul. 5, 2007

(51) Int. Cl.
*E04G 3/00* (2006.01)
*A63B 27/00* (2006.01)

(52) U.S. Cl. ..................... 182/187; 182/135

(58) Field of Classification Search ............. 182/135, 182/136, 187, 188, 20, 116; 108/152; 297/217.7
See application file for complete search history.

(56) References Cited

U.S. PATENT DOCUMENTS 4,428,459 A * 1/1984 Peck ........................ 182/187
4,834,217 A * 5/1989 Manes ...................... 182/187
4,890,694 A * 1/1990 Williams ................... 182/187
4,909,353 A * 3/1990 Govin et al. ............... 182/187
5,156,236 A * 10/1992 Gardner .................... 182/187
5,775,464 A * 7/1998 Gardner .................... 182/187
6,588,546 B1 * 7/2003 Forrest ..................... 182/135
6,622,823 B2 * 9/2003 Engstrom .................. 182/136
6,698,549 B2 * 3/2004 Graham et al. ............ 182/136
6,948,589 B2 * 9/2005 Johnson .................... 182/136
6,959,786 B2 * 11/2005 Craft ........................ 182/187

* cited by examiner

*Primary Examiner*—Hugh B. Thompson, II
(74) *Attorney, Agent, or Firm*—George A. Seaby

(57) ABSTRACT

A tree stand includes a platform having a tree engaging end; a pair of hollow support arms pivotally connected to the sides of the platform; a belt having ends slidable in the support arms for forming a loop around a tree trunk to connect the platform to the tree; latches on the arms for locking the ends of the belt in position; and a bungee cord or spring connecting one end of the belt to the platform or support arms, whereby when one latch is released the belt is pulled into one arm to shorten the loop around the tree.

5 Claims, 3 Drawing Sheets

TREE STAND

BACKGROUND OF THE INVENTION

1. Field of the Invention

This invention relates to a tree stand, and in particular to a stand which can be used to climb and support a load in a tree.

2. Discussion of the Prior Art

As described in the inventor's U.S. Pat. No. 6,588,546, issued Jul. 8, 2003, (which is incorporated herein by reference) tree stands are load supporting platforms used primarily by hunters. The stands are used to climb a tree and to support a hunter at an elevated position on the trunk of a tree. Most conventional tree stands are formed of two parts, including a top or seat platform and a bottom or footrest platform. Examples of such tree stands are disclosed by U.S. Pat. No. 4,488,620, issued to L. R. Gibson on Dec. 18, 1984; U.S. Pat. No. 4,589,522, issued to D. L. Shelton on May 10, 1986; U.S. Pat. No. 4,596,309, issued to J. W. Venson on Jun. 24, 1986; U.S. Pat. No. 4,942,942, issued to R. E. Bradley on Jul. 24, 1990; U.S. Pat. No. 5,097,925, issued to G. T. Walker, Jr. on Mar. 24, 1992; U.S. Pat. No. 5,234,076, issued to R. L. Louk et al on Aug. 10, 1993; U.S. Pat. No. 5,775,464, issued to B. D. Gardner on Jul. 7, 1998; U.S. Pat. No. 5,842,541, issued to N. Arcuri on Dec. 1, 1998; U.S. Pat. No. 5,862,883, issued to S. N. Carriere on Jan. 26, 1999; U.S. Pat. No. 5,921,348, issued to J. M. Louk et al on Jul. 13, 1999; U.S. Pat. No. 5,975,242, issued to R. R. Woller et al on Nov. 2, 1999 and U.S. Pat. No. 6,264,000, issued to S. M. Johnson on Jul. 24, 2001.

It will be noted that the basic elements of tree stands of the type described herein include a planar load supporting platform; a pair of support arms connected to the sides of the platform; a belt having free ends slidable in free ends of the support arms for forming a loop around the tree, and latches on the support arms for releasably locking the free ends of the belt in the free ends of the support arms. Two load supporting platforms are required. An upper platform includes a seat for supporting a person, and a lower platform supports the feet.

When climbing a tree, the outer end of a platform is tilted upwardly so that the belt can be slid up the tree trunk. In the case of the upper platform, the user stands on the lower platform and manually manipulates the upper or seat platform. The lower platform is moved using the feet, which are connected to the lower platform by a strap. The strap is also used to connect the platforms together when the stand is in the storage or transport condition. Obviously, the platforms should be kept as close as possible to the horizontal. As the stand is moved up a tree the length of the loop of belt around the tree must become smaller as the diameter of the tree trunk reduces; otherwise, the platform will no longer be horizontal. Accordingly, the belt must be shortened which is done by releasing one of the latches and pushing the belt into the tubular support arm. A problem with existing stands is the difficulty in making the loop shorter as the trunk becomes narrower. The user is required to release the belt latch with one hand and manually move the belt into the support arm with the other hand. This is particularly difficult when shortening the belt on the lower platform.

GENERAL DESCRIPTION OF THE INVENTION

The object of the present invention is to provide a solution to the above-mentioned problem in the form of a relatively simple mechanism, which facilitates shortening of the belt used to hold a stand on a tree.

Accordingly, the invention relates to a tree stand comprising a planar load supporting platform; support arms pivotally connected to sides of said platform having first ends pivotally connected to opposite sides of said platform, and second, free ends, said support arms being rotatable between a collapsed position against said platform and an erect position in which said free ends of the support arms are elevated above the platform; a belt having a pair of ends slidably mounted in said free ends of said support arms for forming a loop around a tree; latches on said support arms for releasably locking the free ends of said belt in the free ends of said support arms; and an elongated, resilient, extensible connector element connecting one end of said belt to one support arm or to said platform for biasing the said one end of the belt into said one support arm.

BRIEF DESCRIPTION OF THE DRAWINGS

The invention is described below in greater detail with reference to the accompanying drawings, wherein.

DESCRIPTION OF PREFERRED EMBODIMENTS

Figure 1:
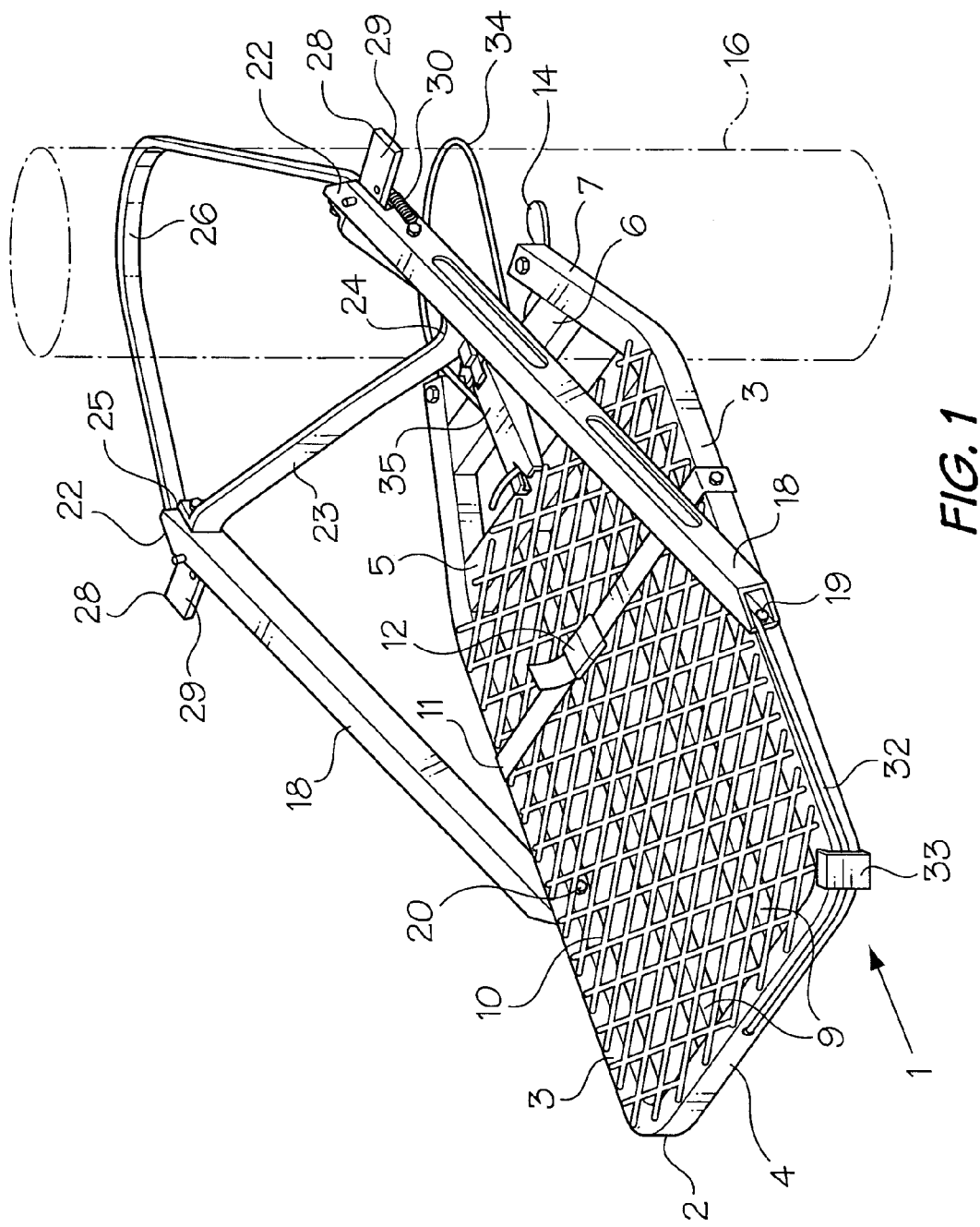
FIG. 1 is an isometric view of a lower platform of a tree stand in accordance with the present invention.

While FIG. 1 of the drawings illustrates a lower platform, it will be appreciated by those skilled in the art to which the invention relates that the novel belt assembly described herein can be used in the upper platform of a tree stand.

Figure 2:
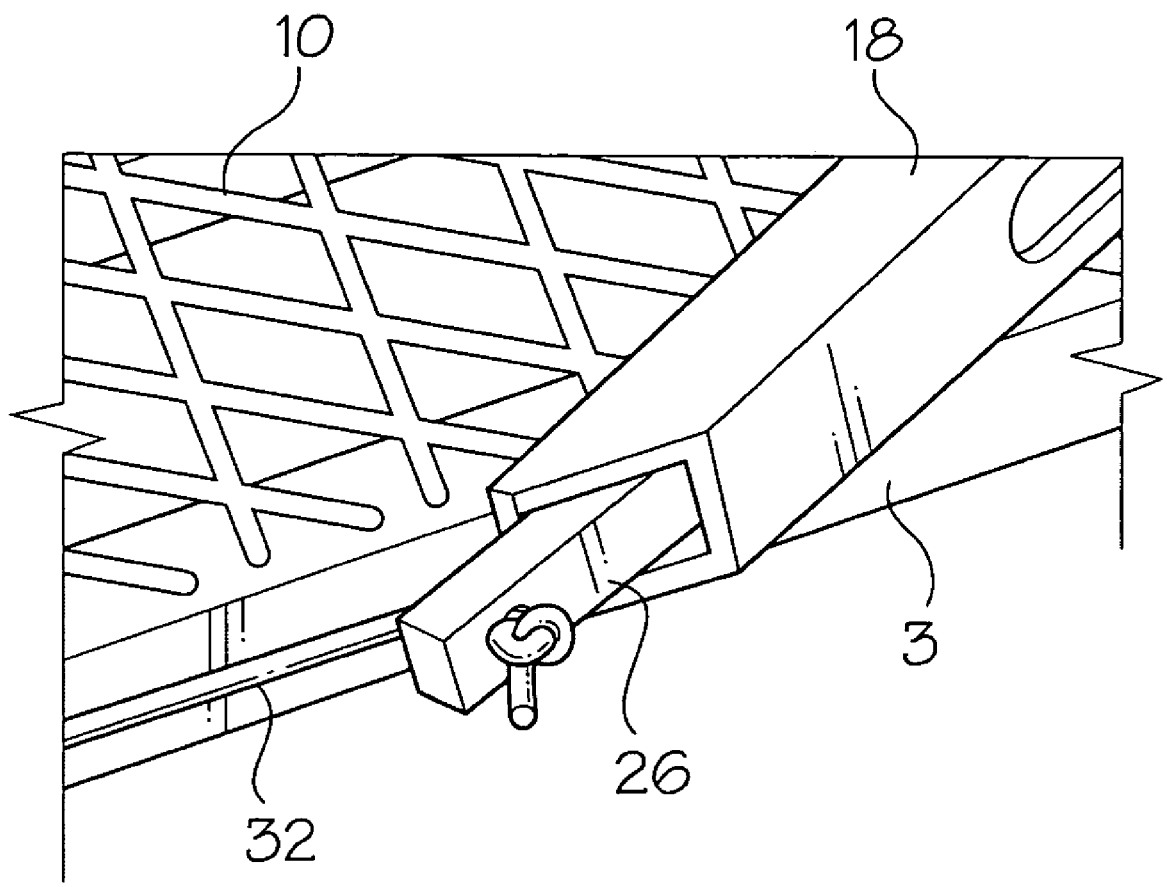
FIG. 2 is an isometric view of one corner of the platform of FIG. 1 showing a portion of a belt assembly.

Referring to FIGS. 1 and 2 of the drawings, the lower platform indicated generally at 1 of a tree stand includes a rectangular frame 2 defined by sides 3, outer end 4, and crossbars 5 and 6 extending between the converging sides 3 at an inner tree engaging end 7 of the frame 2. Reinforcing bars 9 extend longitudinally between the end 4 and the crossbar 5 for supporting a mesh floor 10. The ends of a belt 11 with a buckle 12 are secured to the sides 3. The belt 11 is used to secure upper and lower platforms together during storage or transport, and to secure the feet of a user to the lower platform during tree climbing (as described above).

Wing-shaped teeth 14 are pivotably connected the inner ends of the frame sides 3 (as fully described in the above-referenced U.S. Pat. No. 6,588,546) by bolts 15 and nuts (not shown) for gripping a tree 16 to stabilize the platform.

A pair of tubular support arms 18 are pivotably connected to the sides 3 of the platform by bolts 19 and nuts 20 (one of each shown in FIG. 1) for rotation between a use position (FIG. 1) and a non-use position (not shown) against the sides 3 of the frame 2. The free ends 22 of the support arms 18 are interconnected by a generally V-shaped end wall 23, the bottom corner 24 of which is pivotally connected to the crossbar 6. The L-shaped free ends 25 of the end wall 23 are pivotally connected to the arms 18 so that the arms and wall can be folded flat against the platform and rotated to the elevated, use position shown in FIG. 1.

The free ends (not shown) of an elongated belt 26 are slidably mounted in the tubular support arms 18. During use, the belt 26 extends around a tree trunk 16 to hold the lower platform 1 on the tree. The ends of the belt 26 are retained in the arms 18 by latches 18. Each latch 28 includes a lever 29, which is biased to the latching position shown in FIG. 1 by a helical spring 30 connecting the lever 28 to the corresponding support arm 18. In the past, during tree climbing, as the diameter of the trunk 16 got smaller, the belt 26 was shortened by releasing one of the latches 28 and pushing an end of the belt into a support arm 18. In the case of the present invention, it is merely necessary to release one of the latches 28 (the one on the right in FIG. 1) in order to shorten the belt 26. For such purpose, an extensible, resilient element, which in this case is a bungee cord 32, is connected to one end of the belt 26 and to the outer end 4 of the frame 2. As shown in FIG. 2, connection of the cord 32 to the belt 26 can be effected merely by passing one end of the cord 32 through one free end of the belt 26 and knotting the end of the cord. A bracket 33 at the corner of the frame 2 maintains the cord 32 against the edge of the platform. Thus, when the latch 26 is released, the cord 32 pulls the belt 26 into the support arm 18 to reduce the size of the loop defined by the belt around the tree trunk 16.

As in the case of the inventor's earlier stand, once the platform 1 reaches the desired location on a tree, the platform is secured in position by a cord 34, one end of which is connected to the frame 2. Once the cord 34 is passed around a tree trunk 16, the other free end of the cord is placed in the lever 35 of a tensioner and the lever is rotated to the tension position shown in FIG. 1 to tighten the cord around the trunk.

Figure 3:
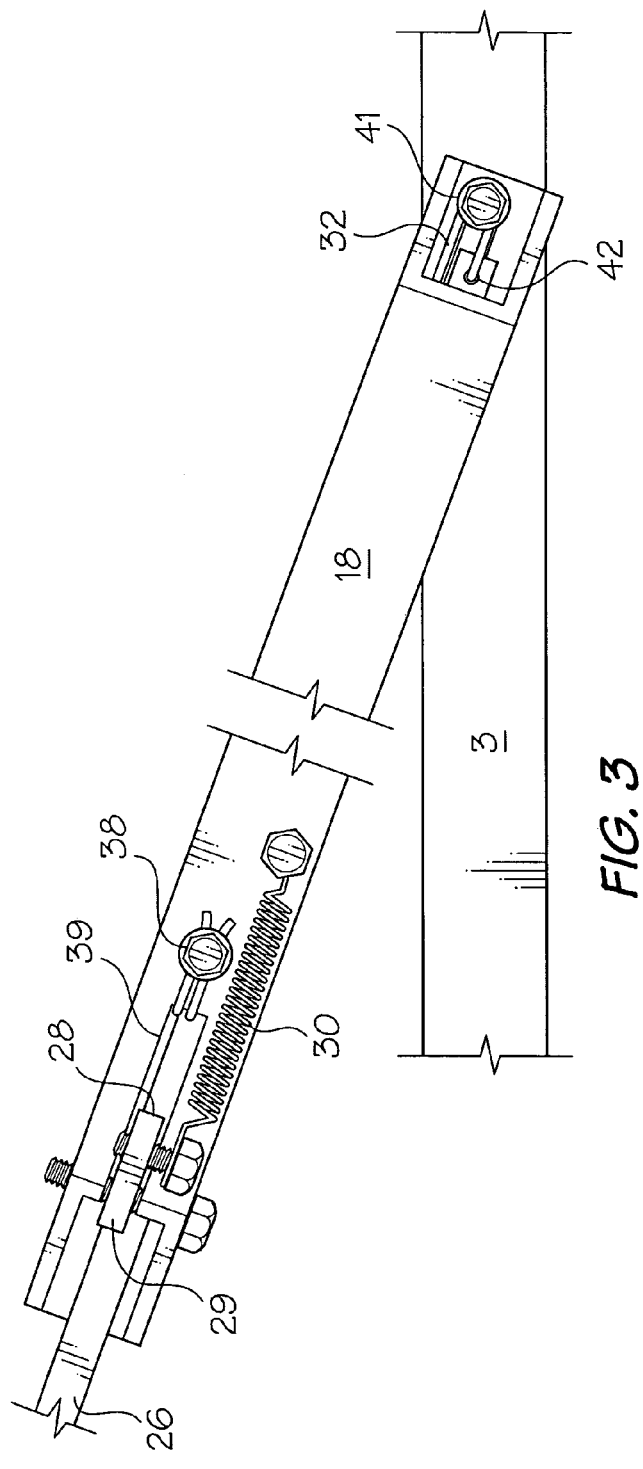
FIG. 3 is a side view of a support arm and a portion of a lower platform of a second embodiment of the tree stand of the present invention.
Figure 4:
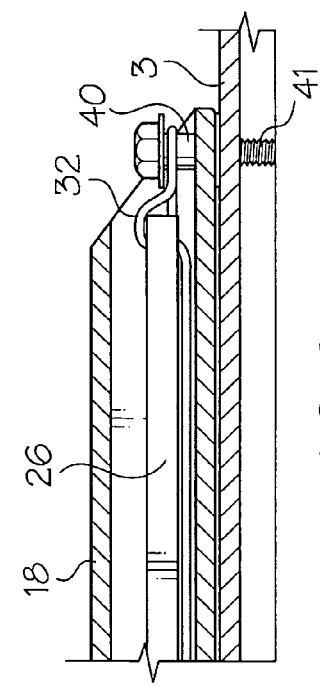
FIG. 4 is a longitudinal sectional view of on end of the support arm and belt assembly of FIG. 3.

Referring to FIGS. 3 and 4, in a second embodiment of the invention, the extensible cord 32 is mounted in one of the support arms 18. Both free ends 36 of the cord 32 are connected to the top end of the arm 18 by a bolt 38. The cord 32 extends though a slot 39, which receives the latch lever 28, into the support arm 18. The cord 32 extends downwardly through the arm 18 around a sleeve 40 on a bolt 41 at the bottom end of the arm 18, through a hole 42 (FIG. 3) in the bottom end of the belt 26, back around the sleeve 40, and up through the arm 18 and the slot 39 to the bolt 38.

Figure 5:
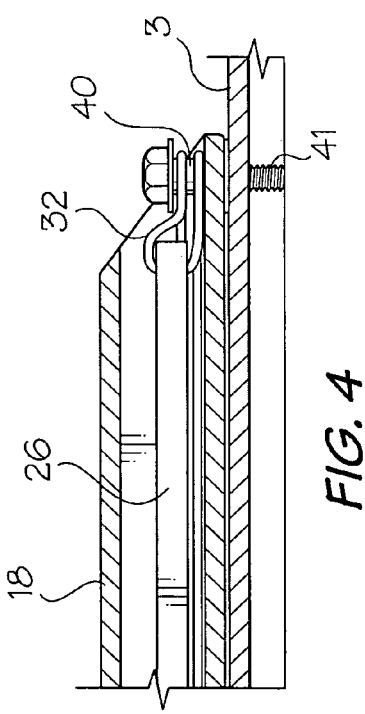
FIG. 5 is a longitudinal sectional view similar to FIG. 4 of a third embodiment of the belt assembly of the present invention.

In a third embodiment fo the invention (FIG. 5), the cord 32 extends from the bolt 38, through the slot 39, downwardly through the support arm 18, around the sleeve 40, through the belt 26, and upwardly through the arm 18 and the slot 39 to the bolt 38.

It will be appreciated that while the belt 26 is preferably an ordinary V-belt or the like, the belt can also be a chain or a cable. Moreover, the bungee cord illustrated in the drawings can be replaced by a helical spring or any other extensible, resilient element.

I claim:

1. A tree stand comprising a planar load supporting platform; support arms pivotally connected to sides of said platform having first ends pivotally connected to opposite sides of said platform, and second, free ends, said support arms being rotatable between a collapsed position against said platform and an erect position in which said free ends of the support arms are elevated above the platform; a belt having a pair of ends slidably mounted in said free ends of said support arms for forming a loop around a tree; latches on said support arms for releasably locking the free ends of said belt in the free ends of said support arms; and an elongated, resilient, extensible connector element connecting one end of said belt to the first end of one support arm or to said platform for biasing one end of the belt into said one support arm.

2. The tree stand of claim 1, wherein said connector element is a bungee cord extending between said one end of said belt and one end of the platform.

3. The tree stand of claim 1, wherein said connector element is a helical spring.

4. The tree stand of claim 1, wherein said connector element is a bungee cord having a pair of ends connected to said second end of one said support arm, and a bolt at said one end of said support arm, said cord passing through said one support arm and around said bolt to said one end of said belt.

5. The tree stand of claim 4, including a sleeve on said bolt for slidably supporting said belt.

* * * * *